United States Patent
Dennison et al.

(12)
(10) Patent No.: US 6,839,527 B2
(45) Date of Patent: Jan. 4, 2005

(54) METHOD, APPARATUS AND PROGRAM PRODUCT USING ARTIFICIAL PAGES IN VISUAL JOB TICKETING

(75) Inventors: Carl Michael Dennison, Longmont, CO (US); Brian William Moroney, Longmont, CO (US); Dwight Ross Palmer, Longmont, CO (US); Adam A. Swartz, Thornton, CO (US); John Stuart Walker, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/065,512

(22) Filed: Oct. 25, 2002

(65) Prior Publication Data

US 2003/0086719 A1 May 8, 2003

Related U.S. Application Data

(60) Provisional application No. 60/357,807, filed on Oct. 26, 2001.

(51) Int. Cl.[7] .............................................. G03G 15/00
(52) U.S. Cl. ........................... 399/83; 399/81; 399/382; 358/1.18
(58) Field of Search ........................ 399/81, 82, 382, 399/83, 77; 358/1.18, 1.12, 1.13, 1.15

(56) References Cited

U.S. PATENT DOCUMENTS

| | | | | |
|---|---|---|---|---|
| 5,655,759 A | * | 8/1997 | Perkins et al. | 270/52.02 |
| 6,041,200 A | * | 3/2000 | Glass et al. | 399/82 |
| 6,173,295 B1 | * | 1/2001 | Goertz et al. | 715/505 |
| 6,271,926 B1 | * | 8/2001 | Jacobs | 358/1.15 |
| 6,393,232 B1 | * | 5/2002 | Osari et al. | 399/82 |
| 6,442,368 B1 | * | 8/2002 | Ohtsuka et al. | 399/382 |
| 6,509,974 B1 | * | 1/2003 | Hansen | 358/1.12 |
| 6,581,097 B1 | * | 6/2003 | Lynch et al. | 709/226 |

FOREIGN PATENT DOCUMENTS

| | | | | |
|---|---|---|---|---|
| EP | 864933 A1 | * | 9/1998 | G03G/15/00 |
| EP | 1098266 A2 | * | 5/2001 | G06K/15/00 |

* cited by examiner

*Primary Examiner*—Robert Beatty
(74) *Attorney, Agent, or Firm*—Scott W. Reid

(57) ABSTRACT

A print job is displayed as a sequence of pages. An operator is enabled to create artificial pages representing such elements as cover pages and preprinted sheets which are normally apart from the print job data file. The artificial pages are inserted into a display of the real pages defined by the print job data file or original document and are therefore displayed visually just as the other document pages are displayed. They can be manipulated just like other pages; that is, they can be moved, deleted, replaced and so on.

15 Claims, 3 Drawing Sheets

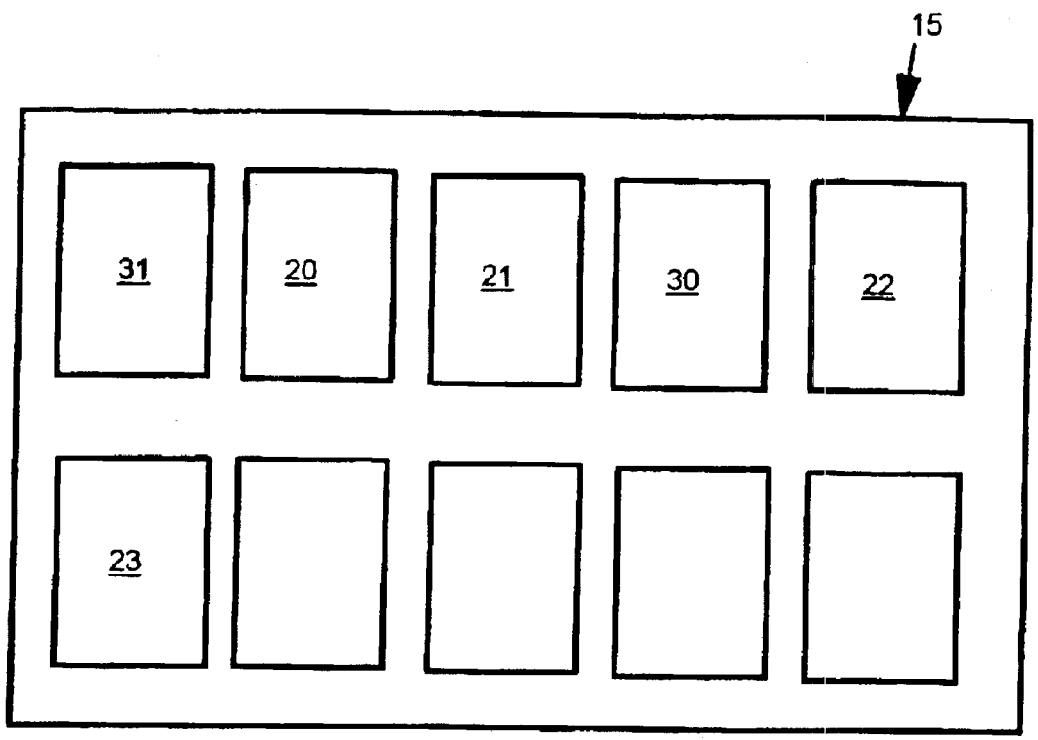
Fig. 3
Fig. 4
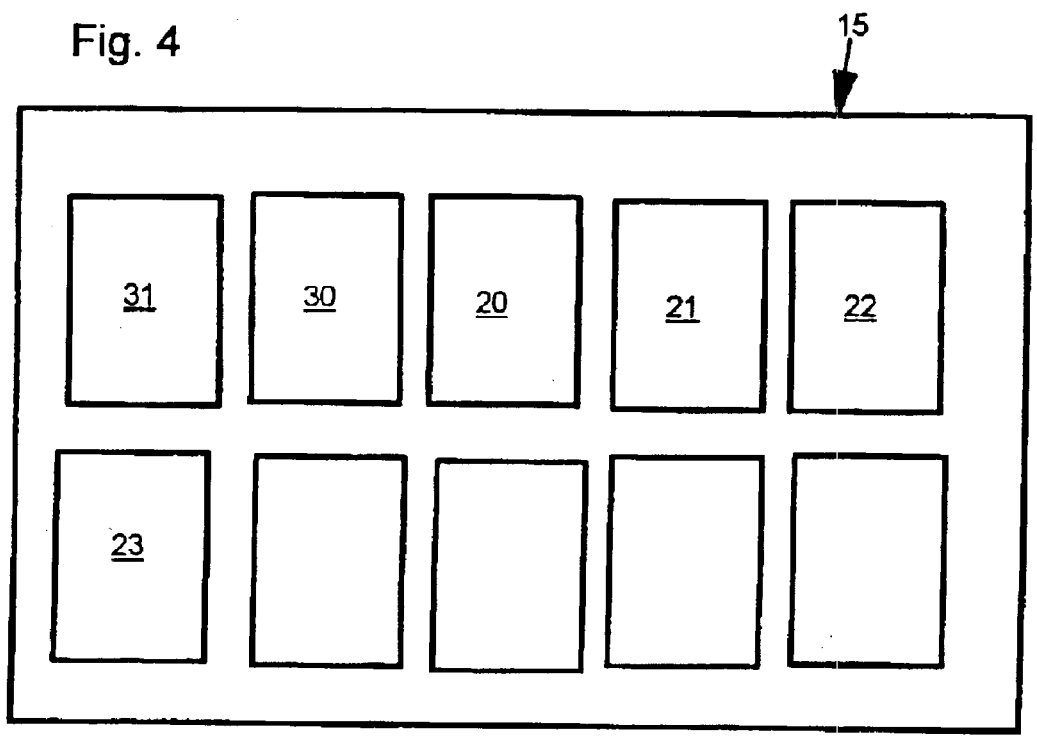

METHOD, APPARATUS AND PROGRAM PRODUCT USING ARTIFICIAL PAGES IN VISUAL JOB TICKETING

CROSS REFERENCE TO RELATED APPLICATIONS

This application claims priority from Provisional Application Ser. No. 60/357,807 filed Oct. 26, 2001.

BACKGROUND OF INVENTION

The invention relates to the field of printing using modern, high-feature printers. More specifically, the invention relates to facilitated and flexible processing of complex print job parameters such as document cover and sheet insert specifications.

At the outset, it is useful to review certain terminology which will be used in the following discussions. A print job typically is a data file stored accessibly to an information handling system such as a high function personal computer or a network server. The data file may have been originated in a number of ways known to printing technologists, including original document keying, scanning, use of graphics design programs, and the like. The print job may be understood as defining a sequence of pages. A page is one surface of a sheet. The sheet may be a cut sheet, as in a single piece of what is known to most as letter size paper, or a continuous roll. With two surfaces, a sheet may receive two pages. In transferring a print job to a printer, an operator will create a job ticket which describes to the printer or print server the control functions necessary to cause the print job to appear on the finished pages as desired by the originator. These control functions may include incorporation of special features or elements, repetition from one page to another of certain features or elements, changes in fonts or paper, and the like.

When preparing jobs for printing on high-feature printers, such as the IBM Infoprint 2000 and others, the job originator may specify job ticket instructions or parameters that are best perceived visually. These parameters may specify such elements as front and back covers and preprinted sheets that the system will add to the print job pages at prescribed locations in a sequence of pages.

Existing products and programs require that a job originator specify these parameters using traditional dialogs and by listing preprinted sheet locations by referring to original document pages; for example, "insert preprinted sheet A after page 3". In such an environment, it is easy for the job originator to make a mistake because there is no visual feedback identifying exactly where each preprinted sheet or cover is to be placed. Some existing products use a proprietary application to provide a 'tree view' of the document that shows preprinted sheets as attached to the surrounding original pages.

It is desirable to provide a more intuitive way of accepting user specifications for cover sheets and preprinted inserts and illustrating the same visually. Job originators should be relieved of the need to remember job page numbers and other print parameters, like duplex status, etc., that may need to be adjusted to make the print job come out correctly.

SUMMARY OF INVENTION

The present invention contemplates the display of a print job as a sequence of pages and facilitates operator understanding of the final print job presentation by enabling the creation of what are here called artificial pages representing such elements as cover pages and preprinted sheets which are normally apart from the print job data file. The artificial pages are inserted into a display of the real pages defined by the print job data file or original document and are therefore displayed visually just as the other document pages are displayed. They can be manipulated just like other pages; that is, they can be moved, deleted, replaced and so on. The system remembers which pages are artificial and removes them from the document before printing and saving. All of this is transparent to the job originator.

In order to implement the invention, the job ticket records the information held by the artificial pages. Artificial pages are not tied to any particular real page; they are pages in their own right.

The present invention reduces job ticket errors and increases ticketing speed because it uses an intuitive visual feedback method to confirm the job ticket originator's intent. Preprinted sheets and covers have a certain order and appearance when printed; the invention presents the same order and appearance to the job originator during the ticketing process so the job ticket originator can see the end result before submitting the job.

BRIEF DESCRIPTION OF DRAWINGS

Some of the purposes of the invention having been stated, others will appear as the description proceeds, when taken in connection with the accompanying drawings, in which:

FIGS. 2, 3 and 4 are schematic representations of displays generated during exercise of the present invention.

DETAILED DESCRIPTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
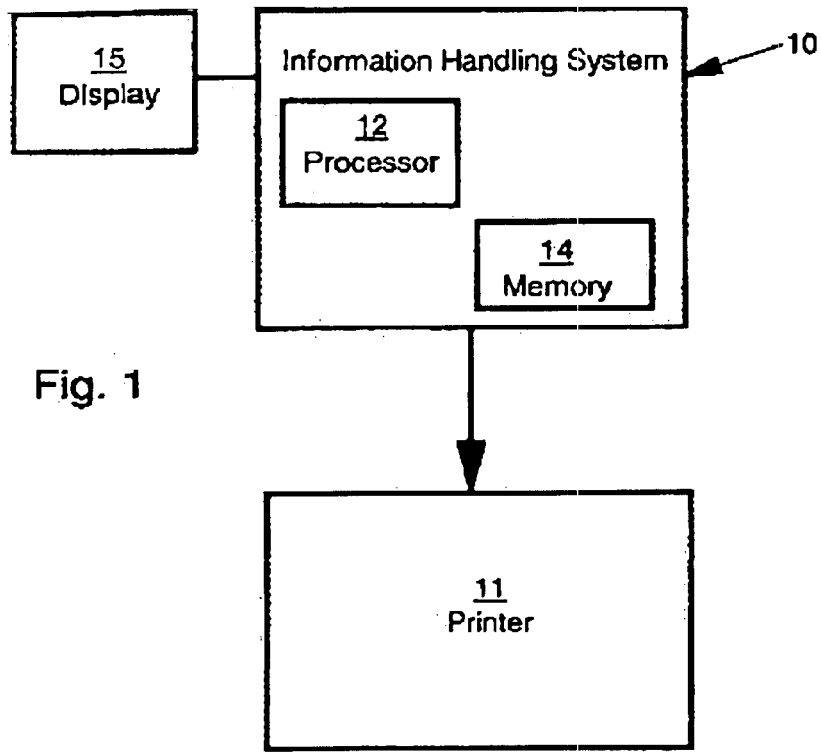
FIG. 1 is a schematic representation of an information handling system and associated printer in which the present invention is implemented.

Referring now to FIG. 1, an information handling system implementing the present invention is there shown at 10 with an associated high feature printer 11. The system 10 has a processor 12, associated memory 14, and a display 15. Appropriate operator manipulated input devices such as a keyboard or pointing device are provided as well known in the applicable arts, but are not illustrated as being well, known. By using the input devices, an operator may cause the system 10 to retrieve and execute programs and operate on data files which may be stored in the memory 14 or otherwise be accessible to the processor 12 as through a network, from a removable disk or the like.

Figure 2:
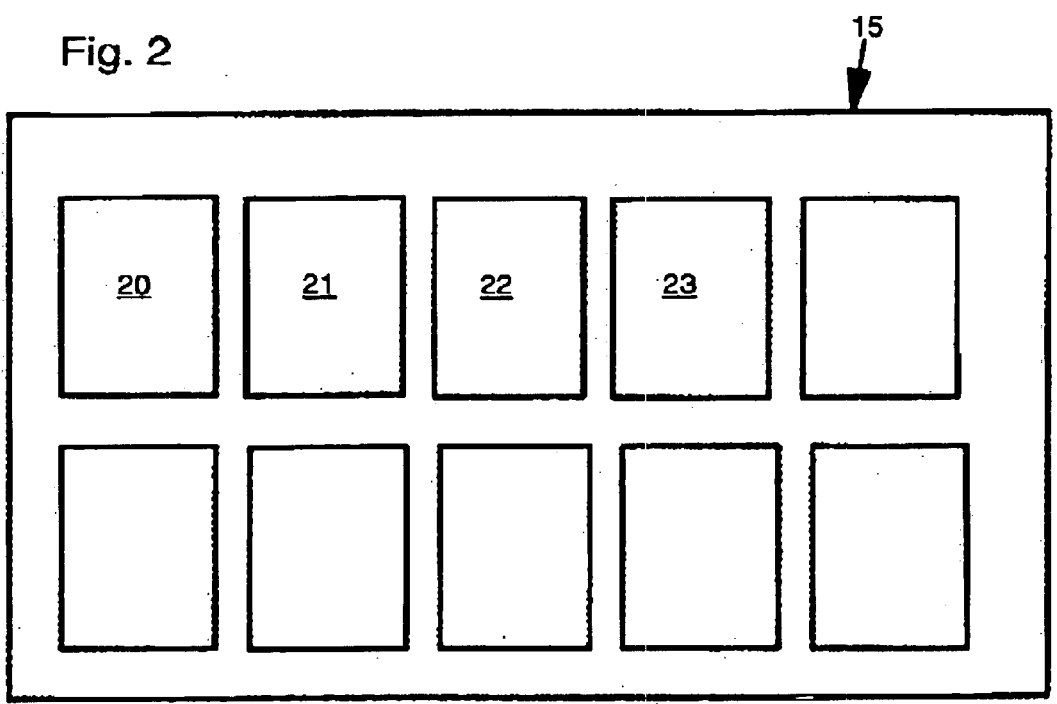

FIGS. 2 through 4 are representations of displays created on the display 15 by execution of programs by the system 10 and illustrate certain distinguishing characteristics of the present invention. In particular, common reference characters are used in the successive Figures to denominate the same element, for ease in understanding. Displayed on the display 15 are a succession of pages as described more fully hereinafter. The display provides the end user interface which accomplishes the purposes of the present invention.

In FIG. 2, the display 15 presents a sequence of pages 20, 21, 22, 23 which are defined by the print job data file and are denominated in the discussion above as original or real pages.

In FIG. 3, the display 15 presents the sequence of pages shown In FIG. 2 with the addition of two artificial pages 30, 31. As here shown, the artificial page 30 may be a preprinted page which is to appear between real pages 21 and 23. In that position, the page 30 may be a preprinted divider, special graphics page, or the like. The other artificial page 31 is a cover page. It will be apparent that the plurality of pages may be more than two and that such pages may be distributed among the sequence of pages shown in FIG. 2.

However, if the first mentioned page 30 were, for example, a second cover page to appear at the beginning of the sequence, then the operator could reposition the page to the beginning of the sequence as shown in FIG. 4.

As suggested in the immediately preceding discussion, the present invention enables automatic creation of new pages (referred to as "artificial") that are equivalent in size to the selected media associated with the new pages. Artificial pages are marked as such with text on the page (e.g., "[inserted sheet:StockA]" or "[cover:CoverStockB]") that identifies the page as either a preprinted insert or a cover page. The invention contemplates that the page designation also includes the stock name to further identify the artificial page.

When a user creates, deletes, or moves an artificial page, the invention notes the change in the job ticket. The user treats artificial pages just like real pages. The user is unaware that the artificial page persists only in the job ticket and not in the original document.

The invention removes all artificial pages before saving the document, before printing the document, and before switching to another job ticket associated with this document. Then, the artificial pages are reapplied after saving, after printing, and after switching to a different job ticket. This way, the artificial pages are not actually stored or printed. Only the job ticket controls where artificial pages are placed.

Inserted sheets are always simplex and a change of media from surrounding pages. In a duplex print job, if the page before the insert was a front sheet side, it becomes a front sheet side with a blank back side. If the page after the insert was a back sheet side, it becomes a front sheet side, and the "sidedness" of subsequent pages is automatically changed to match.

In the preferred embodiment of the invention, inserted pages are numbered with a prefix like "Insert-N" where N is the number of the insert in the document. This leaves the original document page numbering alone so that the user can refer to original page numbers even after inserts are added. An alternative algorithm numbers inserted pages sequentially with the original pages.

The invention allows a user to turn the display of inserts on and off. When inserts are not displayed, which would appear similarly to FIG. 2, the invention deletes the artificial pages from the document, restoring it to its original condition. Because the job ticket keeps track of the inserts locations, when the user changes the selection to display inserts the invention can create new artificial pages in the correct locations. When printing, the invention removes inserted pages and converts user-selected page ranges (including inserts) to real document page ranges (not including inserts).

If the alternate embodiment is being used and artificial pages are numbered sequentially with real pages, then the document page numbers change when inserts are shown or hidden, and any stored page ranges must change to match the new document numbering. This can be confusing, for example, to an operator who remembered a page range when inserts were shown and now tries to use the range when inserts are hidden. The confusion can be avoided by choosing a different numbering scheme for inserts and leaving original page numbering unaffected, as in the preferred embodiment.

When copying pages from a ticketed source document on disk into a destination document for printing, the invention allows users to specify page ranges including inserts, in which case inserted pages in the source page range are copied to the destination job ticket and the invention automatically adds the corresponding artificial pages to the destination document. The invention also allows users to specify page ranges without inserts, which correspond to the pages of the source document file without job ticketing. In this case, inserted pages that the source ticket identifies as being within the selected page range are optionally copied to the destination document. The invention prompts the user to select whether or not to include the inserted pages in the copy.

When replacing pages in a destination document with pages from a ticketed source document, the invention replaces the destination real pages with the source real pages, and adds any source inserts from the source page range to the destination ticket. Alternatively, the invention could treat the source page range (including inserts) as full pages and replace whatever destination pages (real or insert) with the source pages (real or insert).

Cover sheets are always simplex if preprinted. The invention allows covers to be printed on the front, on the back, or on both sides, in which cases one or two real pages from the document are included as the cover media. When the user selects a particular cover attribute, the invention automatically inserts an artificial page for a preprinted cover, or changes the page attributes of real pages for a print side X choice. Once pages are marked as covers, if the user moves, deletes, inserts or replaces cover pages, the cover attributes are now invalid and the invention removes them (with appropriate warning to the user about what it is doing). The preprinted cover page becomes a simple inserted page, and the real pages become simple page exceptions to choose new media. Alternately, the preprinted cover page could be deleted and the real pages become body pages when the cover attributes are removed.

Figure 5:
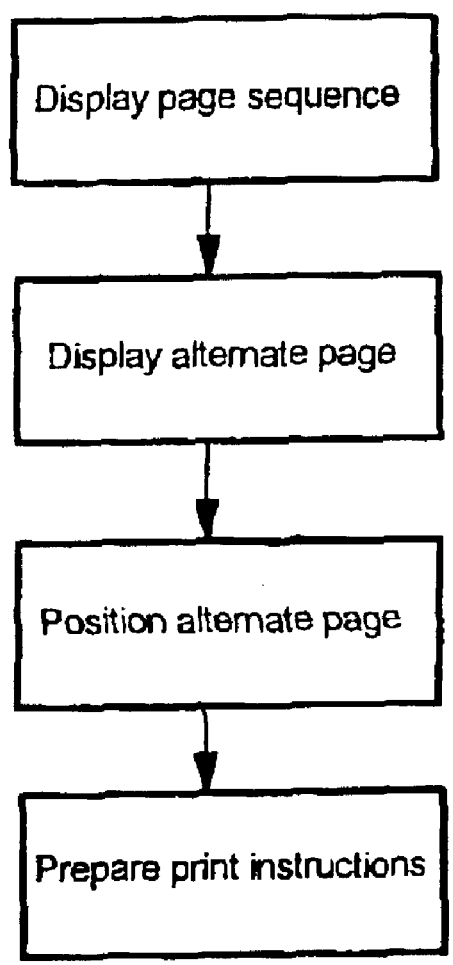
FIG. 5 is a schematic representation of the steps of the method of the present invention, in flowchart form.
Figure 6:
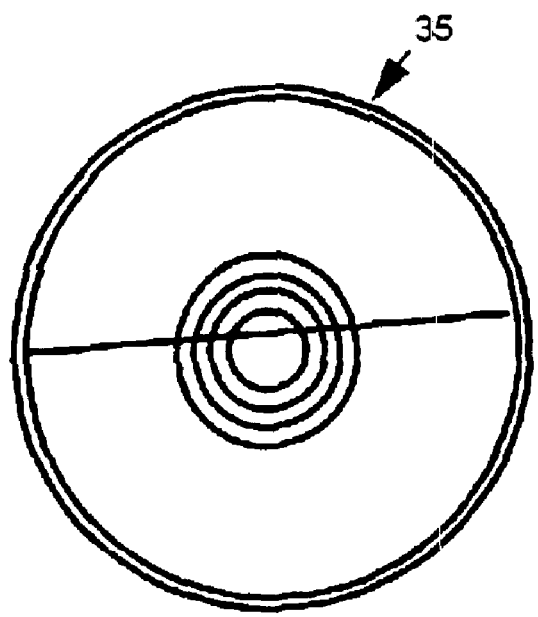
FIG. 6 is an illustration of a computer readable medium bearing program instructions effective when executing to implement the present invention.

Program instructions implementing the present invention as here described and shown may be distributed on computer readable media such as the disc 35 shown in FIG. 6 and, when executing on a processor, will follow the steps shown in FIG. 5.

In the drawings and specifications there has been set forth a preferred embodiment of the invention and, although specific terms are used, the description thus given uses terminology in a generic and descriptive sense only and not for purposes of limitation.

What is claimed is:

1. A method comprising:

displaying a sequence of pages present in a print job;

accepting input from a user requesting insertion of at least one alternate page into the displayed sequence at a position indicated by said input;

in response to said input, updating said display of the sequence of pages to include said at least one alternate page in said indicated position;

creating a job ticket describing print instructions associated with the print job, including the identification and location of said at least one alternate page;

storing said job ticket accessibly to a printer;

in response to a request from said user, printing said print job on said printer in accordance with said job ticket.

2. The method according to claim 1 wherein the print job may have a plurality of associated job tickets and wherein said user request specifies which job ticket to utilize in printing the print job.

3. The method according to claim 2 wherein printing said print job further comprises displaying to the user the sequence of pages present in the print job in accordance with the specified job ticket.

4. The method according to claim 1 wherein each job ticket may be utilized with multiple print jobs and with multiple printers and wherein said user request specifies which print job and which printer to utilize in conjunction with the job ticket.

5. The method according to claim 4 wherein printing the specified print job further comprises displaying to the user the sequence of pages present in the specified print job in accordance with the specified job ticket and the specified printer.

6. Apparatus comprising:

an information handling system comprising a processor, memory and a display;

end user interface program instructions stored accessibly to said information handling system and effective when executing on said processor to:

access a print job which is stored accessibly to said information handling system and which defines a sequence of pages to be printed;

display on said display the sequence of pages present in said print job;

accept input from an end user requesting insertion of at least one alternate page into the displayed sequence at a position indicated by said input;

in response to said input, update said display of the sequence of pages to include said at least one alternate page in said indicated position;

create a job ticket describing print instructions associated with the print job, including the identification and location of said at least one alternate page;

store said job ticket accessibly to a printer;

in response to a request from said user, print said print job on said printer in accordance with said job ticket.

7. The apparatus according to claim 6 wherein the print job may have a plurality of associated job tickets and wherein said user request specifies which job ticket to utilize in printing the print job.

8. The apparatus according to claim 7 wherein printing said print job further comprises displaying to the user the sequence of pages present in the print job in accordance with the specified job ticket.

9. The apparatus according to claim 6 wherein each job ticket may be utilized with multiple print jobs and with multiple printers and wherein said user request specifies which print job and which printer to utilize in conjunction with the job ticket.

10. The apparatus according to claim 9 wherein printing the specified print job further comprises displaying to the user the sequence of pages present in the specified print job in accordance with the specified job ticket and the specified printer.

11. A program product comprising:

a computer readable storage medium;

end user interface program instructions stored on said medium and effective when executing on an information handling system to:

access a print job which is stored accessibly to said information handling system and which defines a sequence of pages to be printed;

display on said display the sequence of pages present in said print job;

accept input from an end user requesting insertion of at least one alternate page into the displayed sequence at a position indicated by said input;

in response to said input, update said display of the sequence of pages to include said at least one alternate page in said indicated position;

create a job ticket describing print instructions associated with the print job, including the identification and location of said at least one alternate page;

store said job ticket accessibly to a printer;

in response to a request from said user, print said print job on said printer in accordance with said job ticket.

12. The program product according to claim 11 wherein the print job may have a plurality of associated job tickets and wherein said user request specifies which job ticket to utilize in printing the print job.

13. The program product according to claim 12 wherein printing said print job further comprises displaying to the user the sequence of pages present in the print job in accordance with the specified job ticket.

14. The program product according to claim 11 wherein each job ticket may be utilized with multiple print jobs and with multiple printers and wherein said user requests specifies which print job and which printer to utilize in conjunction with the job ticket.

15. The program product according to claim 14 wherein printing the specified print job further comprises displaying to the user the sequence of pages present in the specified print job in accordance with the specified job ticket and the specified printer.

* * * * *